United States Patent
Nakano et al.

(10) Patent No.: US 8,542,008 B2
(45) Date of Patent: Sep. 24, 2013

(54) DISPLACEMENT SENSOR

(75) Inventors: Yasushi Nakano, Kobe (JP); Hiroshi Akase, Kobe (JP); Daiju Kaneshiro, Kobe (JP)

(73) Assignees: Shinko Electric Co., Ltd., Kobe-Shi, Hyogo (JP); Nabtesco Corporation, Tokyo (JP)

( * ) Notice: Subject to any disclaimer, the term of this patent is extended or adjusted under 35 U.S.C. 154(b) by 386 days.

(21) Appl. No.: 12/443,745

(22) PCT Filed: Oct. 2, 2007

(86) PCT No.: PCT/JP2007/069278
§ 371 (c)(1),
(2), (4) Date: Mar. 31, 2009

(87) PCT Pub. No.: WO2008/044545
PCT Pub. Date: Apr. 17, 2008

(65) Prior Publication Data
US 2010/0072987 A1    Mar. 25, 2010

(30) Foreign Application Priority Data
Oct. 5, 2006  (JP) .................................. 2006-273808

(51) Int. Cl.
*G01B 7/14* (2006.01)
(52) U.S. Cl.
USPC .................................................. 324/207.18
(58) Field of Classification Search
USPC ................... 324/207.15, 207.18; 340/870.36
See application file for complete search history.

(56) References Cited

U.S. PATENT DOCUMENTS

| 2,706,805 | A | * | 4/1955 | Clewell | 367/185 |
| 4,514,689 | A | * | 4/1985 | Gerard | 324/207.18 |
| 4,599,560 | A | * | 7/1986 | Sanford et al. | 324/207.18 |
| 5,710,509 | A | * | 1/1998 | Goto et al. | 324/207.25 |
| 5,796,357 | A |   | 8/1998 | Kushihara | |
| 6,442,210 | B1 | * | 8/2002 | Pennell | 375/259 |
| 6,803,757 | B2 | * | 10/2004 | Slates | 324/207.17 |
| 7,248,994 | B1 | * | 7/2007 | Stolan | 702/158 |

(Continued)

FOREIGN PATENT DOCUMENTS

| DE | 1908891 A1 | 9/1969 |
| GB | GB 1262747 | 2/1972 |

(Continued)

OTHER PUBLICATIONS

International Search Report mailed Oct. 30, 2007 for PCT/JP2007/069278.

(Continued)

*Primary Examiner* — Jermele M Hollington
*Assistant Examiner* — David M. Schindler
(74) *Attorney, Agent, or Firm* — Duane Morris LLP (57) ABSTRACT

A displacement sensor includes a primary coil (2), secondary coils (4a, 4b), and a movable magnetic core (6) movable with displacement of an object to be measured to cause voltages generated in the secondary coils (4a, 4b) to vary. The secondary coils (4a, 4b) are differentially interconnected. A polyphase signal generating unit (10) generates two-phase component signals having different phases, from a differentially combined output voltage of the secondary coils (4a, 4b). Full-wave rectifying units (16, 18) rectify the polyphase component signals, the rectified polyphase component signals are combined in a combiner (22), and the combiner output is applied to a low-pass filter (24).

6 Claims, 6 Drawing Sheets

(56) References Cited

U.S. PATENT DOCUMENTS

| | | | |
|---|---|---|---|
| 2002/0071298 A1* | 6/2002 | Pennell | 363/67 |
| 2002/0089326 A1* | 7/2002 | Morrison et al. | 324/207.12 |
| 2003/0071522 A1* | 4/2003 | Baranowski et al. | 307/116 |
| 2005/0156599 A1 | 7/2005 | Panzer | |
| 2010/0001718 A1* | 1/2010 | Howard et al. | 324/207.15 |

FOREIGN PATENT DOCUMENTS

| | | |
|---|---|---|
| JP | 63-133001 A | 6/1988 |
| JP | 06-273191 A | 9/1994 |
| JP | 08-334306 | 12/1996 |
| JP | 2006-10478 A | 1/2006 |
| WO | WO 02/09271 A2 | 1/2002 |
| WO | WO 2006/067420 A1 | 6/2006 |

OTHER PUBLICATIONS

Supplemental European Search Report in corresponding EU Application No. 07829018.6-2213/2071294 dated Dec. 13, 2011, 5 pages.

* cited by examiner

DISPLACEMENT SENSOR

TECHNICAL FIELD

This invention relates to a displacement sensor including a coil and a movable magnetic core and providing an output signal varying in accordance with the displacement of the movable magnetic core, and, more particularly, to rectification and smoothing of the output of such displacement sensor.

BACKGROUND ART

An example of known displacement sensors of the above-described type, including a coil and a movable magnetic core, is disclosed in Patent Literature 1. Patent Literature 1 discloses applying an output voltage of the displacement sensor to a ramp forming circuit, or low-pass filter, for the purpose of suppressing needle-shaped interfering pulses in the output voltage prior to rectifying the output voltage.
Patent Literature 1: JP 2005-521048

DISCLOSURE OF INVENTION

Technical Problem

When using a low-pass filter as in the above-described case, the time constant of the low-pass filter must be large in order to satisfactorily suppress interfering pulses. However, a large time constant causes delay of the low-pass filter output, and, therefore, the technology of Patent Literature 1, which uses a large time constant low-pass filter, cannot be used for systems requiring a fast response. A low-pass filter may be used to smooth an output signal of a displacement sensor after rectifying it. In such case, if a low-pass filter having a large time constant is used for the purpose of increasing the rectification precision, the response is decreased for the same reason.

An object of this invention is to provide a displacement sensor with a fast response.

Solution to Problem

A displacement sensor according to an aspect of the present invention includes a coil and a movable magnetic core moving in accordance with displacement of an object to be measured. The coil may be only a primary coil, or may be a primary coil and a secondary coil. In such case, the primary coil is supplied with a periodic signal, e.g. a sinusoidal signal, from a periodic signal source. Either a plurality of secondary coils, or a single secondary coil may be used. In accordance with displacement of the movable magnetic core, the output signal of the displacement sensor varies. Polyphase signal generating means generates, in response to the output signal of the displacement sensor, a plurality of polyphase component signals exhibiting different phases. The polyphase component signals are rectified in a plurality of rectifying means for the respective ones of the polyphase component signals. Combining means combines rectified outputs of the rectifying means.

With the above-described arrangement of the displacement sensor, the output signal is converted into polyphase component signals. For example, when the output signal is a sine-wave signal, polyphase sine waves result. The polyphase sine wave component signals are rectified. Then, ripple frequency components of the resulting combined signal can be of higher order, and, in addition, the ripples per se can be reduced. Accordingly, a lower-order low-pass filter or a low-pass filter having a higher cutoff frequency can be used as the low-pass filter supplied with the output signal of the combining means, so that the delay of the output signal of the low-pass filter can be maintained small, resulting in fast response.

A plurality of secondary coils may be first and second secondary coils. The first and second secondary coils are differentially connected so that the difference between the output signals of the respective coils is developed as the coil output signal. Alternatively, first polyphase signal generating means is provided for the first secondary coil, with second polyphase signal generating means provided for the second secondary coil, and the polyphase component signals from the first polyphase signal generating means are respectively rectified in first rectifying means, and the polyphase component signals from the second polyphase signal generating means are respectively rectified in second rectifying means. The respective rectified outputs from the first rectifying means and the rectified outputs from the second rectifying means are differentially combined.

The polyphase signal generating means may include a path through which the output signal of the displacement sensor is directly outputted, and one or more phase shifting means to which the output signal of the displacement sensor is applied. For example, for a two-phase system, one phase shifting means is used. For a three-phase system, two phase shifting means are used. In other words, the number of the phase shifting means to be used is the number of the phases minus one. The phase shifting means phase shifts in such a manner that the crests of the rectified output waveform of the output signal of the phase shifting means are located between the crests of the rectified output waveform of the output signal of the displacement sensor.

The rectifying means may be half-wave rectifying means. In this case, the number of the phase shifting means to be used is n (where n is a positive integer equal to or greater than one). The amount of phase to be shifted by each of the n phase shifting means is such that a phase difference of 1/(n+1) of one cycle of the output signal of the displacement sensor is present between the polyphase component signals. With this arrangement, the half-wave rectified signals of the respective polyphase component signals can be produced without cancelling the other half-wave rectified component signals, and the component signals can be combined with small ripples.

In an alternative arrangement, the rectifying means may be full-wave rectifying means. In this case, the number of the phase shifting means to be used is n (where n is a positive integer equal to or greater than one). The amount of phase to be shifted by each of the n phase shifting means is such that a phase difference of ½(n+1) of one cycle of the output signal of the displacement sensor is present between the polyphase component signals. With this arrangement, the amount of phase shift can be smaller, and the signals can be combined with smaller ripples than in the case of half-wave rectification.

BEST MODE FOR CARRYING OUT INVENTION

Figure 1:
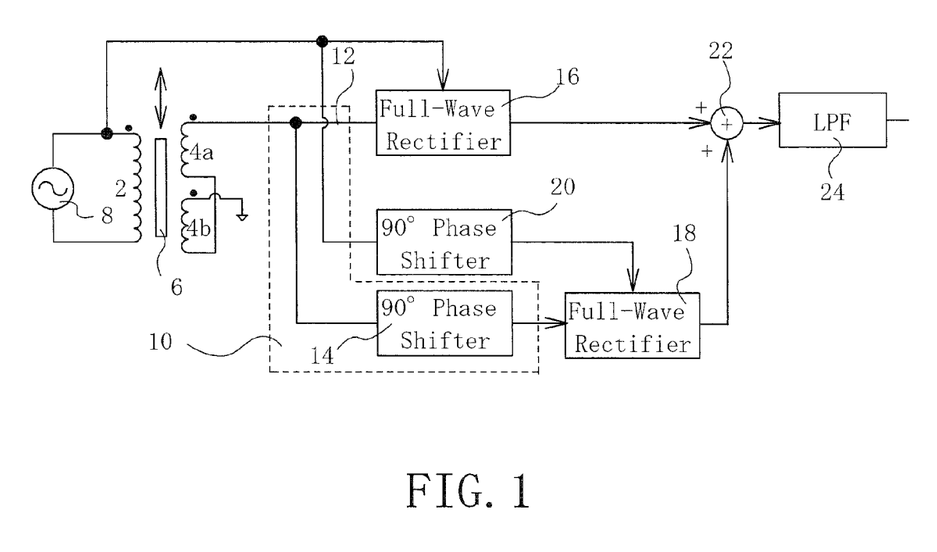
FIG. 1 is a block diagram of a displacement sensor according to a first embodiment of the present invention.

As shown in FIG. 1, a displacement sensor according to a first embodiment of the present invention includes a primary coil 2 and a plurality, two in the illustrated example, of secondary coils 4a and 4b disposed for mutual induction with the primary coil 2. A movable magnetic core 6 is disposed between the primary coil 2 and the secondary coils 4a and 4b. The movable magnetic core 6 is arranged to slide in correlation with an object to be measured, e.g. a movable part, e.g. a piston, of a fluid valve such as pneumatic or hydraulic valve. The primary coil 2 is supplied with a periodic signal, e.g. a sinusoidal signal, from a periodic signal source, e.g. an oscillator 8. The two secondary windings 4a and 4b are connected in a differential fashion. In other words, they are connected in such a manner that the output signals, e.g. output voltages, of the two secondary coils 4a and 4b can be combined, being oppositely poled. Accordingly, when the movable magnetic core 6 is in the neutral position, the output voltages of the two secondary coils are equal in magnitude, and, therefore, the combined output voltage of the secondary coils 4a and 4b is zero. As the movable magnetic core moves, the output voltage of one of the secondary coils 4a and 4b increases and the output voltage of the other decreases, so that a positive or negative combined output voltage is developed, depending on the direction of movement of the movable magnetic core 6.

The combined output voltage is applied to polyphase signal generating means, e.g. a polyphase signal generating unit 10. The polyphase signal generating unit 10 has a path 12 through which the combined output voltage of the secondary coils 4a and 4b is outputted as it is, and phase shifting means, e.g. a 90° phase-shift circuit 14, for phase-shifting the combined output voltage. The 90° phase-shift circuit 14 operates to advance or delay the phase of the combined output voltage of the secondary coils 4a and 4b by 90°. Thus, the combined output voltage of the secondary coils 4a and 4b is converted to two voltages exhibiting a phase difference of 90 degrees.

The combined voltage of the secondary coils 4a and 4b is applied to 15 rectifying means, e.g, a full-wave rectifying circuit 16, through the path 12. The full-wave rectifying circuit 16 is supplied with the voltage of the primary coil 2, too. The full-wave rectifying circuit 16 full-wave rectifies the combined voltage of the secondary coils 4a and 4b in synchronization with the voltage of the primary coil 2. Similarly, the output voltage of the 90° phase-shift circuit 14 is applied to a full-wave rectifying circuit 18. The voltage of the primary coil 2 is advanced or delayed in phase by phase shifting means, e.g. a 90° phase-shift circuit 20, in the same manner as the 90° phase-shift circuit 14 does, before being applied to the full-wave rectifying circuit 18. The full-wave rectifying circuit 18 full-wave rectifies the output voltage of the 90° phase-shift circuit 14 in synchronization with the output voltage of the 90° phase-shift circuit 20.

The full-wave rectified voltages from the full-wave rectifying circuits 16 and 18 are additively combined in combining means, e.g. an additive combiner 22, before being applied to a low-pass filter 24. The output voltage of the low-pass filter 24 represents the amount of displacement of the piston of the pneumatic or hydraulic valve, for example, and is used for feedback control, for example.

Figure 2:
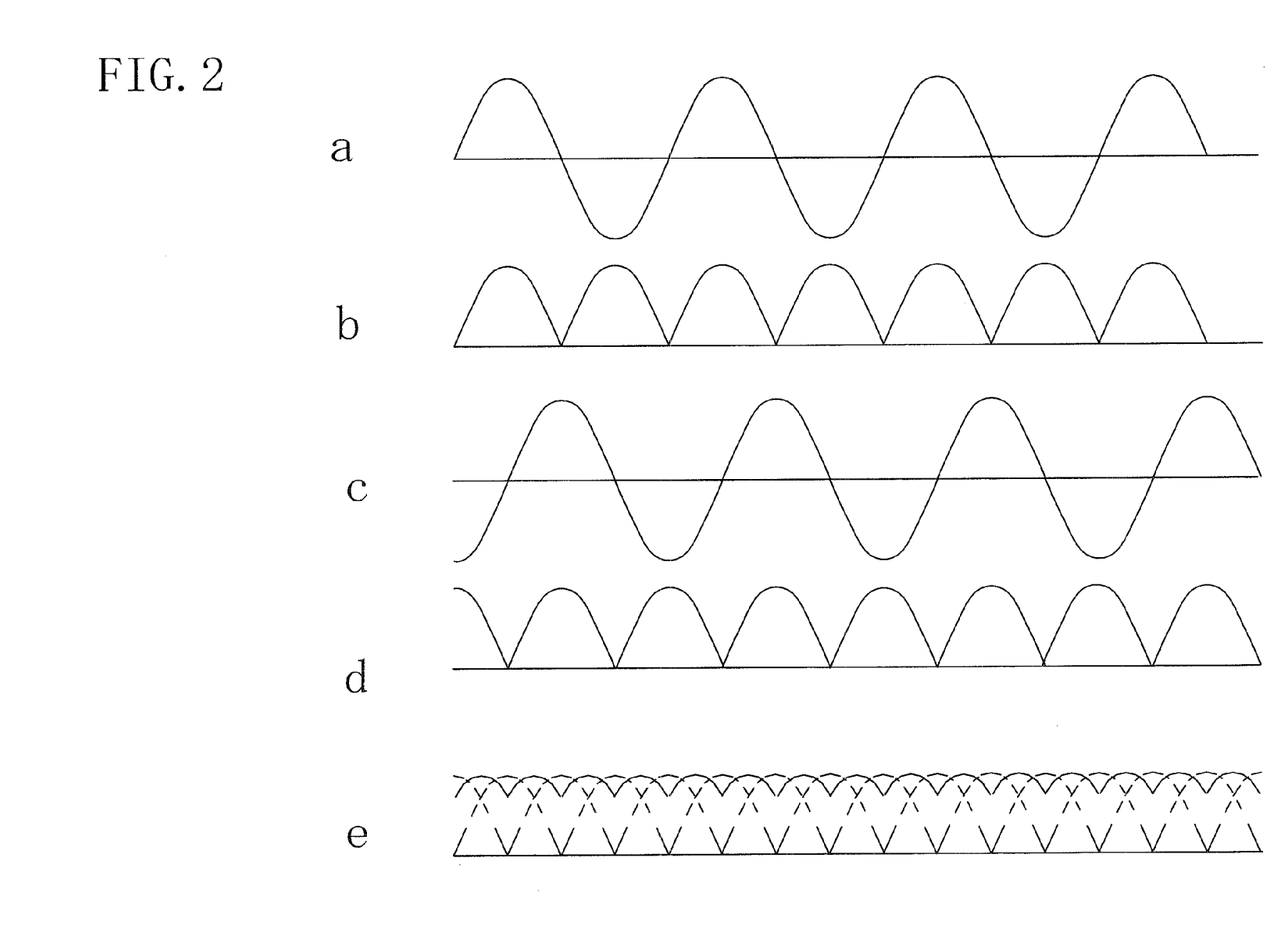
FIGS. 2a through 2e are waveforms appearing at various parts of the displacement sensor of FIG. 1.

Let it be assumed, for example, that the combined output voltage of the secondary coils 4a and 4b is sinusoidal as shown in FIG. 2a. The combined voltage is applied to the full-wave rectifying circuit 16 through the path 12, where it is full-wave rectified into the waveform shown in FIG. 2b. The combined output voltage of the secondary coils 4a and 4b is phase shifted by ninety (90) degrees in the 90° phase-shift circuit 14 as shown in FIG. 2c. The output voltage of the 90° phase-shift circuit 14 is full-wave rectified in the full-wave rectifying circuit 18 into the waveform shown in FIG. 2d. The rectified voltages from the full-wave rectifying circuits 16 and 18 differ in phase by 90 degrees from each other, and, then, the output voltage of the additive combiner 22 is as represented by a solid line in FIG. 2e. For ease of comparison with the rectified voltages from the full-wave rectifying circuits 16 and 18, the rectified voltage from the full-wave rectifying circuits 16 and 18 are shown by broken lines, and the peaks of the rectified voltages from the full-wave rectifying circuits 16 and 18 and the output voltage of the additive combiner 22 are shown to be equal, but, actually, the peak value of the output voltage of the additive combiner 22 is larger than the peak values of the rectified voltages of the full-wave rectifying circuits 16 and 18.

For example, if the combined output voltage of the secondary coils 4a and 4b were full-wave rectified before being applied to the low-pass filter, the low-pass filter would be supplied with a full-wave rectified voltage like the one shown in FIG. 2b. Accordingly, there would be a phase difference of one-hundred and eighty (180) degrees between adjacent peaks. In order to sufficiently smooth this voltage to reduce the ripple factor, a higher-order low-pass filter should be used, which would result in decreased response of the low-pass filter output voltage.

In contrast, the phase difference between adjacent peaks of the output voltage of the additive combiner 22 of the present displacement sensor is halved down to 90 degrees as shown in FIG. 2e, and, therefore, even when the output voltage is sufficiently smoothed to reduce the ripple factor, a low-order filter can be used as the low-pass filter 24. Then, the response of the low-pass filter can be improved, and, even when the sensor is used in a feedback control system, response delay does not occur.

Figure 3:
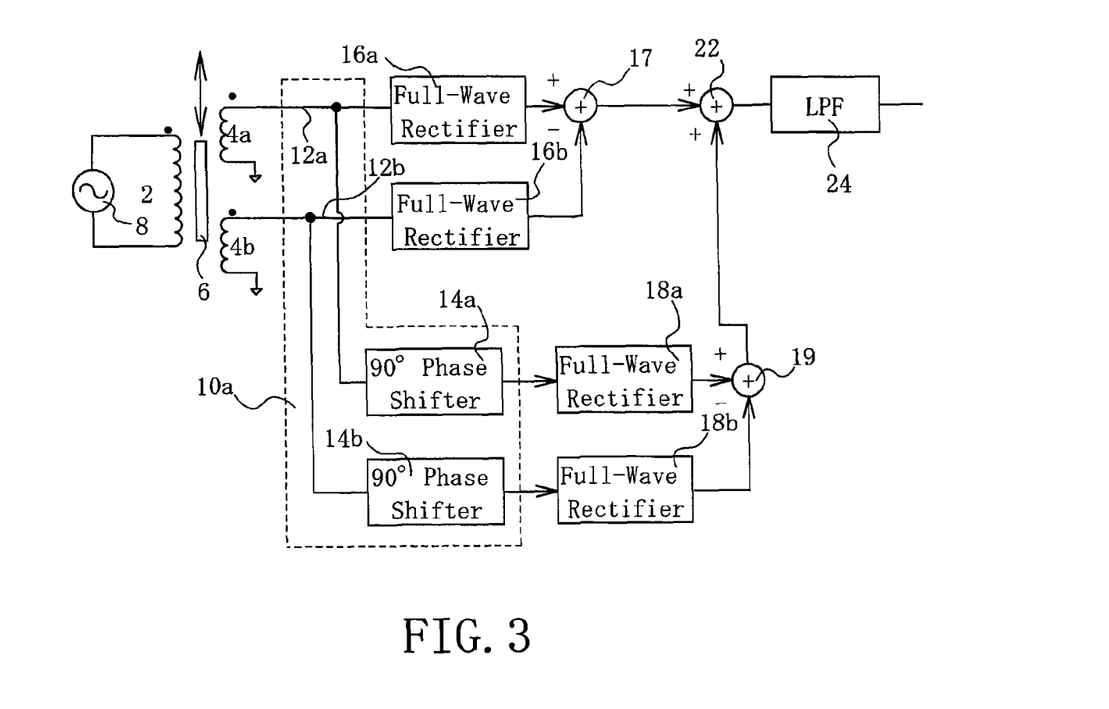
FIG. 3 is a block diagram of a displacement sensor according to a second embodiment of the present invention.

A displacement sensor according to a second embodiment of the present invention is shown in FIG. 3. In this displacement sensor, the secondary coils 4a and 4b are not differentially connected, but the output voltages of the secondary coils 4a and 4b are separately outputted. The output voltages of the secondary coils 4a and 4b are applied respectively to full-wave rectifying circuits 16a and 16b through paths 12a and 12b of a polyphase signal generating unit 10a, where they are full-wave rectified, and the full-wave rectified voltages are differentially combined in an adder 17. In other words, the output voltage of the full-wave rectifying circuit 16b resulting from full-wave rectification of the output voltage of the secondary coil 4b is subtracted from the output voltage of the full-wave rectifying circuit 16a resulting from full-wave rectification of the output voltage of the secondary coil 4a, and the subtraction result is outputted as the output voltage.

The output voltages of the secondary coils 4a and 4b are advanced or delayed in phase by 90 degrees in 90° phase-shift circuits 14a and 14b, respectively, in the polyphase signal generating unit 10a, and the phase-shifted voltages are full-wave rectified in full-wave rectifying circuits 18a and 18b, respectively. The rectified output voltages from the full-wave rectifying circuits 18a and 18b are differentially combined in a combiner 19. In other words, the output voltage of the secondary coil 4a is advanced or delayed in phase by 90 degrees in the 90° phase-shift circuit 14a and, then, full-wave rectified in the full-wave rectifying circuit 18a. The output voltage of the secondary coil 4b is correspondingly advanced or delayed in phase by 90 degrees in the 90° phase-shift circuit 14b and, then, full-wave rectified in the full-wave rectifying circuit 18b. The rectified output voltage from the full-wave rectifying circuit 18b is subtracted from the rectified output voltage from the full-wave rectifying circuit 18a, and the subtraction result is outputted as the output voltage of the adder 19.

The output voltages of the two adders 17 and 19 are combined additively in an adder 22, and the addition result is applied to the low-pass filter 24. The output voltage of the adder 22 is similar to the output voltage of the adder 22 shown in FIG. 2e. Accordingly, in this embodiment, too, a low-order low-pass filter or a low-pass filter having a high cutoff frequency can be used as the low-pass filter 24.

Figure 4:
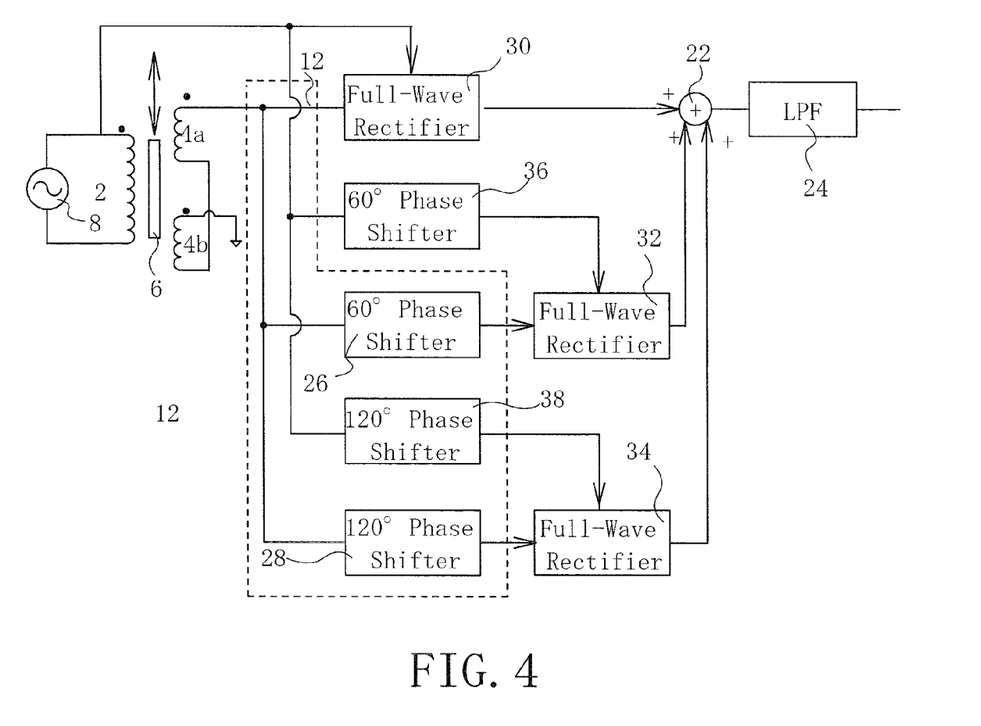
FIG. 4 is a block diagram of a displacement sensor according to a third embodiment of the present invention.

In the above-described two embodiments, two-phase component signals are generated as polyphase component signals in the polyphase signal generating unit 10 or 10a, but polyphase component signals such as three-phase component signals may be used. When three-phase component signals are used as in a third embodiment shown in FIG. 4, the primary coil 2, the secondary coils 4a and 4b, the movable magnetic core 6 and the oscillator 8, as used in the first embodiment, are used. An output voltage resulting from differentially combining the output voltages of the secondary coils 4a and 4b is applied to a 60° phase-shift circuit 26 and to a 120° phase-shift circuit 28, whereby the phase difference between the respective polyphase component signals including the combined output voltage of the secondary coils 4a and 4b, the output voltage of the 60° phase-shift circuit 26 and the output voltage of the 120° phase-shift circuit 28, is 60 degrees (a value resulting from dividing a half-cycle, 180 degrees, by 3, which is the result of the sum of the number of the phase-shift circuit plus 1 (i.e. the total number of the phases of the polyphase signal to be produced)). Peaks of the output voltages of the 60° phase-shift circuit 26 and the 120° phase-shift circuit 28 appear during half-cycles of the differentially combined output voltage of the secondary coils 4a and 4b. The combined output voltage of the secondary coils 4a and 4b, and the output voltages of the phase-shift circuits 26 and 28 are rectified in full-wave rectifying circuits 30, 32, and 34, respectively, before they are combined. In this case, the full-wave rectifying circuit 30 is supplied with the voltage of the primary coil, the full-wave rectifying circuit 32 is supplied with the primary coil voltage phase-shifted in a 60° phase-shift circuit 36, and the full-wave rectifying circuit 34 is supplied with the primary coil voltage phase-shifted in a 120° phase-shift circuit 38. The output voltages from the full-wave rectifying circuits 30, 32 and 34 are combined in the additive combiner 22 as in the first embodiment, before being applied to the low-pass filter 24.

Figure 5:
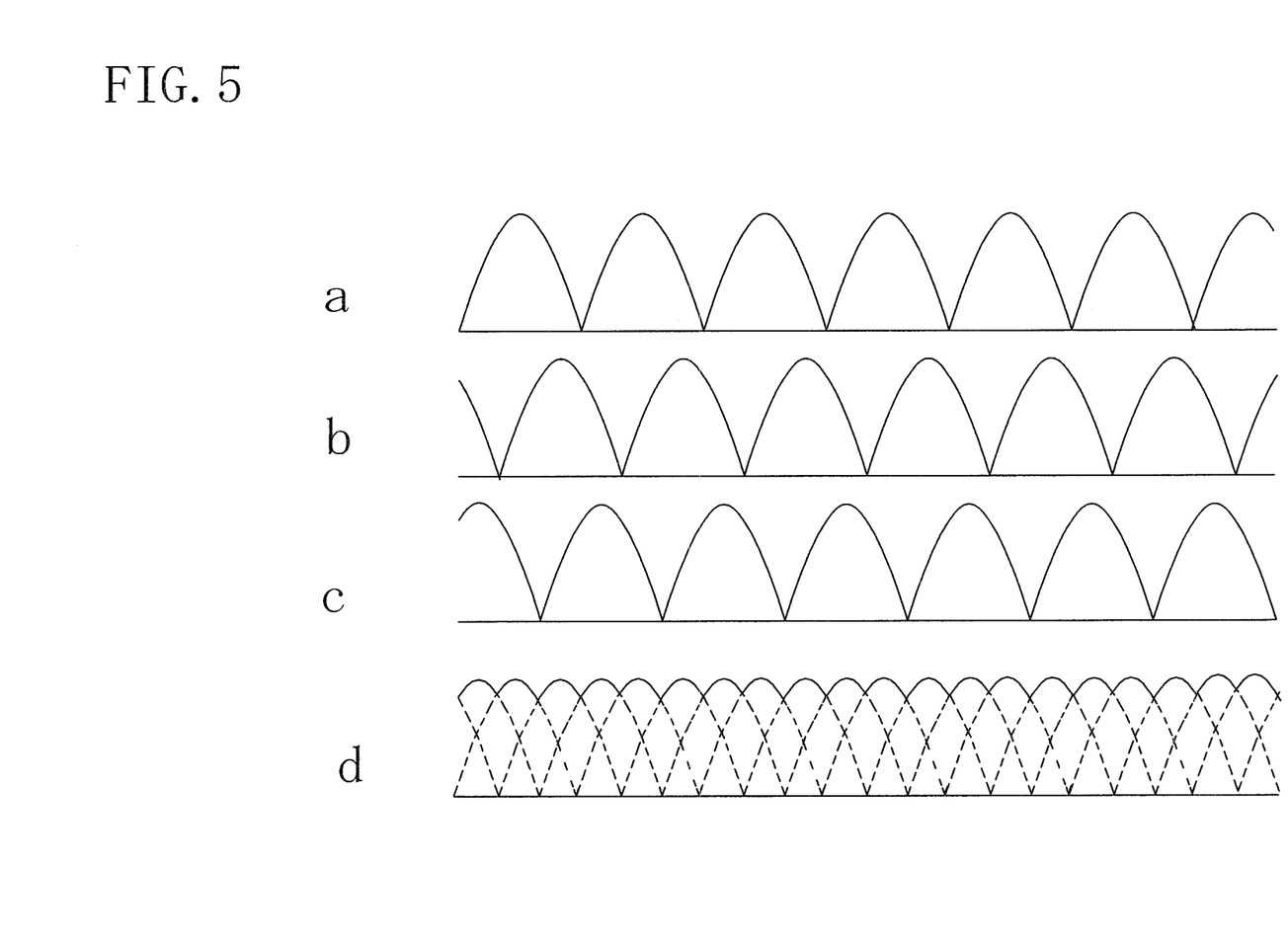
FIGS. 5a through 5d are waveforms appearing at various parts of the displacement sensor of FIG. 4.
Figure 6:
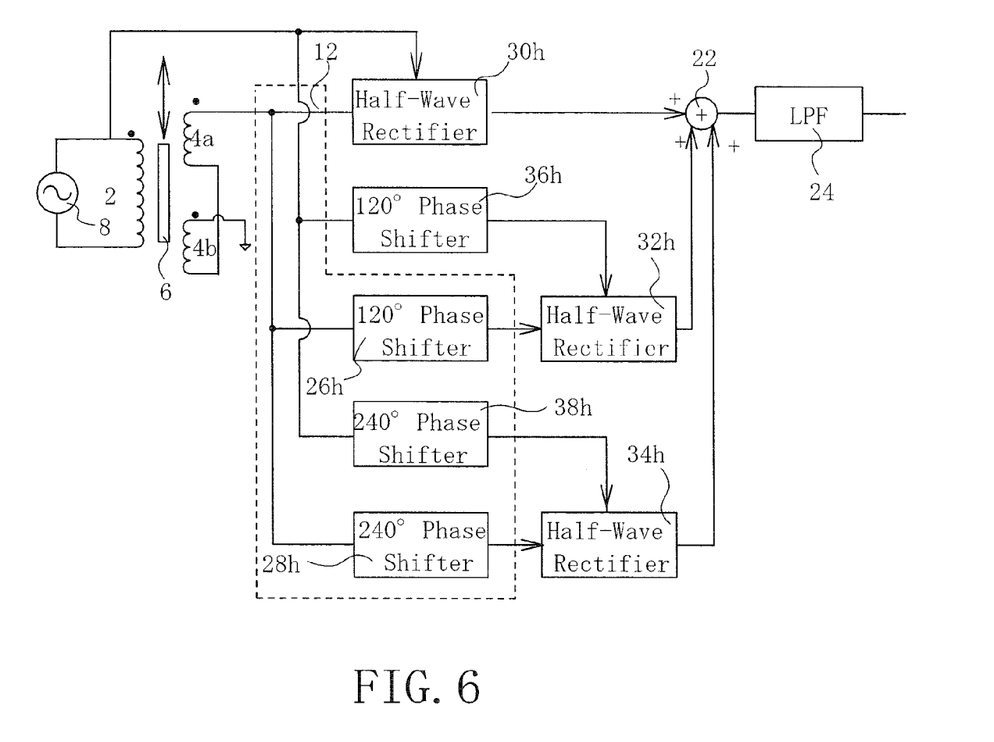
FIG. 6 is a block diagram of a displacement sensor according to a fourth embodiment of the present invention.

The waveform of the full-wave rectified, combined output voltage of the secondary coils 4a and 4b is as shown in FIG. 5a, the waveform of the combined output voltage of the secondary coils 4a and 4b as full-wave rectified after being phase-shifted by 60 degrees is as shown in FIG. 5b, and the waveform of the combined output voltage of the secondary coils 4a and 4b as full-wave rectified after being phase-shifted by 120 degrees is as shown in FIG. 5c. The waveform of the output voltage ultimately resulting from combining these waveforms is represented by a solid line in FIG. 5d. In FIG. 5d, too, the waveform of the full-wave rectified version of the combined output voltage of the secondary coils 4a and 4b, the waveform of the 60-degree phase-shifted and full-wave rectified version of the output voltage of the secondary coils 4a and 4b, and the waveform of the 120-degree phase-shifted and full-wave rectified version of the output voltage of the secondary coils 4a and 4b are represented by broken lines. Also, the waveforms are drawn as if the peaks of these output voltages and the peak of the ultimate combined output voltage were at the same level. As is understood from FIG. 5d, by generating more polyphase component signals by means of the polyphase signal generating circuit, whereby the ultimate, combined waveform approaches more to a DC waveform, so that the order-number of a low-pass filter used can be smaller, or the cutoff frequency of the low-pass filter can be higher.

It should be noted that, when the output voltages of the secondary coils 4a and 4b are separately outputted as in the second embodiment, the output voltages of the secondary coils 4a and 4b are full-wave rectified, and the resulting, full-wave rectified output voltages are differentially combined. In addition, the output voltages of the secondary coils 4a and 4b are respectively phase-shifted by 60 degrees, and, then, full-wave rectified, and the resulting, full-wave rectified output voltages are differentially combined. The output voltages of the secondary coils 4a and 4b are also respectively phase-shifted by 120 degrees, and, then, full-wave rectified, and the resulting, full-wave rectified output voltages are differentially combined. The thus obtained three differentially combined output voltages are additively combined.

The sensors of the above-described three embodiments use full-wave rectifying circuits, but the invention is not limited to it, but half-wave rectifying circuits can be used instead. In such case, it is desirable that the phases of the polyphase signals to be generated be three or larger, because, when the polyphase signal is two-phase signal, effects obtained are equivalent to the effects obtained by using full-wave rectification. For example, for generating three-phase component signals with half-wave rectification, half-wave rectifying circuits 30h, 32h and 34h are used in place of the full-wave rectifying circuits 30, 32 and 34 of the third embodiment, as shown in a fourth embodiment shown in FIG. 4. Also, in place of the 60° phase-shift circuits 26 and 36, 120° phase-shift circuits 26h and 36h are used. In place of the 120° phase-shift circuits 28 and 38, 240° phase-shift circuits 28h and 38h are used.

In the above-described embodiments, two secondary coils are used, but the smallest number of the secondary coils to be used is one. Further, in the described embodiments, separate primary and secondary coils are used, but the invention can be applied to a differential reluctance-type sensor, which uses serially connected two coils and a movable magnetic core, with the coil impedance changing with changes in relative position of the movable core with respect to the coil so that the output signal derived from the node of the series connection is proportional to the displacement of the core.

What is claimed is:

1. A displacement sensor comprising:
   only one transducer comprising:
      only one primary coil arranged to receive a periodic signal from a signal source;
      two secondary coils spaced from said primary coil for mutual induction with said primary coil, said two secondary coils being differentially connected to provide only one periodic secondary output signal from said differentially connected secondary coils; and
      only one movable magnetic core disposed between said primary coil and said secondary coils and arranged to be movable relative to said primary coil and said secondary coils;
   at least one phase shift circuit coupled to said secondary coils, said at least one phase shift circuit receiving said only one periodic secondary output signal and developing at least one periodic phase-shifted signal which is a phase-shifted version of said only one periodic secondary output signal, said at least one phase shift circuit phase shifting said only one periodic secondary output signal in such a manner that a peak of said at least one periodic phase-shifted signal is located between adjacent peaks of said only one periodic secondary output signal;

first rectifying means for rectifying said only one periodic secondary output signal;

at least one second rectifying means for rectifying said at least one periodic phase-shifted signal;

combining means for combining a rectification output of said first rectifying means and a rectification output of said at least one second rectifying means for developing a combined output; and low-pass filter to which said combined output is supplied.

2. The displacement sensor according to claim 1, wherein:

said at least one phase shift circuit is one 90° phase shift circuit receiving said only one periodic secondary output signal and developing a 90°-phase-shifted signal as the at least one periodic phase-shifted signal which is a 90°-phase-shifted version of said only one periodic secondary output signal;

said first rectifying means is a full-wave rectifying circuit which rectifies said only one periodic secondary output signal; and said at least one second rectifying means is a full-wave rectifying circuit which rectifies said 90°-phase-shifted signal.

3. The displacement sensor according to claim 1, wherein:

said first and second rectifying means are half-wave rectifiers; and said at least one phase shift circuit includes n phase shift circuits (where n is a positive integer equal to or greater than two), said at least one periodic phase-shifted signal includes n periodic phase-shifted signals, and amounts of phase shift provided by said n phase shift circuits is such as to provide the n periodic phase-shifted signals having peaks located between adjacent peaks of said only one periodic secondary signal, a phase difference between adjacent ones of said peaks of said n periodic phase-shifted signals being $1/(n+1)$ of one cycle of said only one periodic secondary output signal.

4. The displacement sensor according to claim 1, wherein:

said only one periodic secondary output signal is a periodic voltage;

said at least one phase-shifted signal includes two periodic phase-shifted signals;

said at least one phase shift circuit includes a 120° phase shift circuit developing a 120°-phase-shifted voltage as one of the two periodic phase-shifted signals which is a 120°-phase-shifted version of said periodic voltage, and a 240° phase shift circuit developing a 240°-phase-shifted voltage as the other of the two periodic phase-shifted signals which is a 240°-phase-shifted version of said periodic voltage;

said first rectifying means is a half-wave rectifier for rectifying said periodic voltage; and said at least one second rectifying means includes a half-wave rectifier for rectifying said 120°-phase-shifted voltage and a half-wave rectifier for rectifying said 240°-phase-shifted voltage.

5. The displacement sensor according to claim 1, wherein:

said first and second rectifying means are full-wave rectifiers; and said at least one phase shift circuit includes n phase shift circuits (where n is a positive integer equal to or greater than two), said at least one periodic phase-shifted signal includes n periodic phase-shifted signals, and amounts of phase shift provided by said n phase shift circuits is such as to provide the n periodic phase-shifted signals having peaks located between adjacent peaks of said only one periodic secondary signal, a phase difference between adjacent ones of said peaks of said n periodic phase-shifted signals being $1/2(n+1)$ of one cycle of said only one periodic secondary output signal.

6. The displacement sensor according to claim 1, wherein:

said only one periodic secondary output signal is a periodic voltage;

said at least one phase-shifted signal includes two periodic phase-shifted signals;

said at least one phase shift circuit includes a 60° phase shift circuit developing a 60°-phase-shifted voltage as one of the two periodic phase-shifted signals which is a 60°-phase-shifted version of said periodic voltage, and a 120° phase shift circuit developing a 120°-phase-shifted voltage as the other of the two periodic phase-shifted signals which is a 120°-phase-shifted version of said periodic voltage;

said first rectifying means is a full-wave rectifier for rectifying said periodic voltage; and said at least one second rectifying means includes a full-wave rectifier for rectifying said 60°-phase-shifted voltage and a full-wave rectifier for rectifying said 120°-phase-shifted voltage.

* * * * *